United States Patent [19]
Strohmeyer, Jr.

[11] Patent Number: 6,125,633
[45] Date of Patent: Oct. 3, 2000

[54] SEWAGE ORGANIC WASTE COMPACTION AND INCINERATION SYSTEM INTEGRATED WITH A GAS TURBINE POWER DRIVER EXHAUST GAS FLOW STREAM

[76] Inventor: Charles Strohmeyer, Jr., 14 Hessian Blvd., Reading, Pa. 19607

[21] Appl. No.: 09/093,029

[22] Filed: Jun. 8, 1998

[51] Int. Cl.[7] .................................................. F01K 25/00
[52] U.S. Cl. .............................. 60/671; 60/676; 60/683
[58] Field of Search .................................. 60/39.01, 671, 60/676, 682, 683

[56] References Cited

U.S. PATENT DOCUMENTS

| | | | |
|---|---|---|---|
| 2,658,349 | 11/1953 | Keller | 60/682 |
| 3,866,411 | 2/1975 | Marion et al. | 60/39.02 |
| 4,184,322 | 1/1980 | Paull et al. | 60/39.02 |
| 4,326,382 | 4/1982 | Baardson | 60/655 |

*Primary Examiner*—Hoang Nguyen
*Attorney, Agent, or Firm*—Carothers & Carothers

[57] ABSTRACT

The invention comprising an apparatus for evaporating water in a mixture of water and solids derived from the organic output from a waste water treatment plant. A low cost source of gaseous heat (as the exhaust from a gas turbine driver and in combination with an auxiliary combustor) is used for evaporating the water and safe conditioning the evaporated water vapor after being combined with the exhaust from the gaseous heat source. The solids portion of the organic output from the waste water treatment plant is segregated and safe conditioned separately.

8 Claims, 1 Drawing Sheet

SEWAGE ORGANIC WASTE COMPACTION AND INCINERATION SYSTEM INTEGRATED WITH A GAS TURBINE POWER DRIVER EXHAUST GAS FLOW STREAM

BACKGROUND OF THE INVENTION

This invention relates to improved means for disposal of digested sewage organic wastes by means of de-watering and Safe conditioning of said organic wastes utilizing waste heat from a gas turbine power driver and/or other auxiliary heat source.

SUMMARY OF THE INVENTION

Disposal of high moisture sewage organic sludge in land fills, without having been de-watered and incinerated, is not only costly but also can be hazardous to the environment as well as objectionable to residents living adjacent to said landfills. In the case where a gas turbine, coupled to an organic sludge disposal system, powers an electric generator (or other power consumer), any higher cost associated with production of energy as a consequence of reduced energy producer unit size, can be offset by reduction of disposal charges and benefits which result from weight and volumetric reductions of the waste material upon which disposal fees are based. Also, the safe conditioning process increases the number of disposal locations where it would be permissible to dump said incinerated and dewatered sludge end product.

For the apparatus and systems described herein, a specific objective of this invention is to reduce composite cost of sludge disposal resulting from said integrated operations.

Further objectives are to:

Minimize volume of the disposal material,

Speed up processing time,

Improve the measure of control which can be achieved during the processing period.

Uniformity of processed material,

Eliminate formation of objectionable odors during the processing operation as well as after deposition of the processed sludge into land reclamation projects, Safe condition processed sludge to eliminate runoff of undesirable constituents into rivers and waterways in general.

Figure 1:
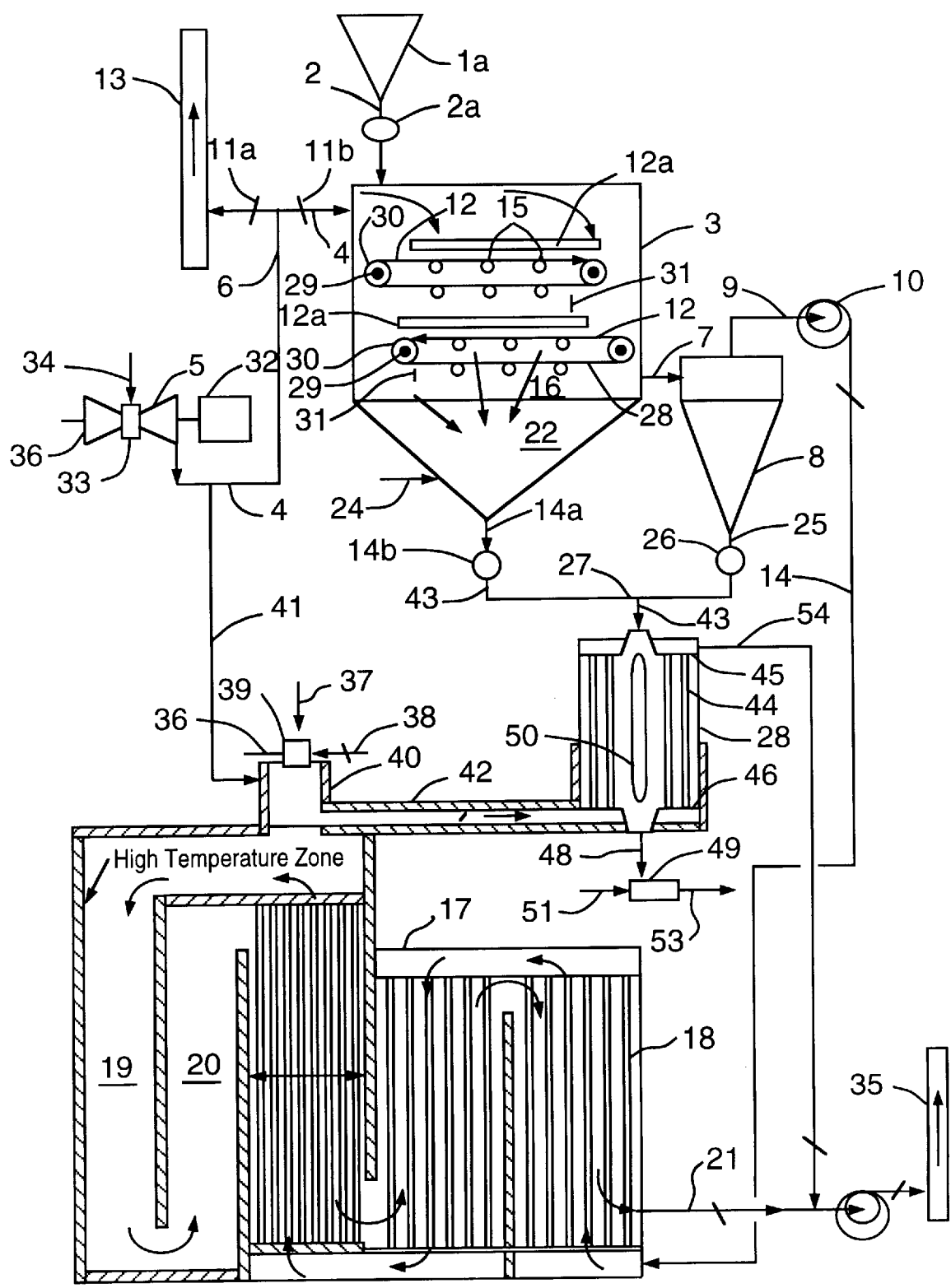
FIG. 1 is a sectional diagrammatic arrangement of a gas turbine driver for powering an energy consumer as an electric generating plant integrated with a sludge disposal process wherein stabilized digested and compressed sludge feed stock 1 (not shown) from hopper 1a, a material high in moisture content, is fed through conduit 2 and feeder 2a to dryer 3 continuous rotating chain link belts 12 which convey feed stock 1 horizontally across dryer 3 in direct contact with gas turbine 5 hot exhaust gas.

Dryer 3 receives a stream of hot exhaust gas, in a range of from 750 to 970° F., through conduit 4 from gas turbine 5, wherein the oxygen content of said gas has previously been partially consumed.

Said hot exhaust gas flows down, over, around, and through dryer 3 continuous rotating chain link belts 1 2 to chamber 1 6 below, through conduit 7, to and through dust separator 8, discharging through conduit 9 to and through induced draft fan 10, through conduit 14 to and through gas incinerator heat exchanger 17 tubular heat exchange surface 18 which discharges to high temperature incinerated sludge vapor retention volume space 19, from which said gas discharges through conduit 20 to the high temperature side of heat exchanger 1 7 surrounding the exterior of heat exchange surfaces 18 facilitating reverse heat transfer from the exterior of tubes 18 to fresh exhaust flow from dryer 3 entering the interior tube surface of heat exchanger 18, thereby minimizing the amount of heat energy required for incineration of dryer 3 discharge gas flow.

Heat for vapor incineration in heat exchanger 17 is provided from Conduit 41 which passes through auxiliary combustor 40, also a source of heat input.

Dust collected in separator 8 is discharged through conduit 25, feeder 26 conduit 27 in series for incineration in solids incinerator 28.

Within dryer 3, sludge feed stock 1 is spread uniformly over rotating power driven continuous metal link belt/s 12 through and over which the hot turbine exhaust gas flow stream mingles with feed stock 1 as the mixture flows horizontally and downward through dryer 3.

Belt/s 12 are supported by rollers 15. End pulleys 30 mounted on drive shafts 29 position belts 12. Drive shafts 29 are driven by motor/s (not shown).

Fixed bars 31 scrape loose sludge materials adhering to the underside of rotating belts 12.

Belts 12, rotate in the direction of the arrows at the conveyed material drop off point of the belt. The arrow/s indicate direction of belt rotation only and are not a physical part of belts 12.

During the drying process while traveling along on top of belts 12, said stabilized digested and compressed sludge feed stock 1 has a tendency to cake and agglomerate which reduces the heat transfer coefficient of the sludge material delaying the moisture evaporation process.

In order to bring the moisture contained in the sludge feed stock more directly in contact with the gas turbine exhaust heat, extended rake like frames 12a hung above belts 12 continuously break up and loosen the sludge material as it passes over the tops of belts 12.

Frames 12a may be vibrated or rotated in a horizontal or horizontal/vertical pattern to screen and break down the particle sizes passing along through tines mounted on frame 12 grids increasing heat transfer effectiveness between the gas turbine exhaust gas and sludge feed stock 1 passing along on the top of belts 12.

Dry sludge which drops down from the ends of belts 12 falls into hopper 22.

Fluidizing air through conduit 24 keeps material collected i n hopper 22 loose and fluid.

Raw sludge moisture may normally be expected to be in a range of up to 76 percent.

Gas turbine 5 drives a power consumer (electric generator 32). Gas fuel is supplied to combustor 33 through conduit 34.

Compressor 36 supplies atmospheric air to combustor 33 under pressure. The products of combustion in combustor 33 exhaust directly to gas turbine 5. Gas inlet through conduit 34 provides the energy to power gas turbine 5.

Gas inlet through conduit 37 and supplemental air flow through conduit 38 to burner 39 in auxiliary combustor 40 provide the booster heat required by heat exchangers 17 and 28 to safe condition the low temperature dry sludge collected in hopper 22 and the low temperature gas exiting dryer 3 through conduit 7.

Ignitor 36 is used to light-off burner 39.

A portion of turbine 5 exhaust gas flow is diverted to auxiliary combustor 40 through conduit 41.

Auxiliary combustor 40 outlet gas is apportioned between solids safe conditioner 28 and vapor safe conditioner (18–19).

Safe conditioner 28 is of the indirect heat exchange type. Heat is exchanged through tubular surface between a portion of gas turbine 5 exhaust gas which has been elevated in temperature in auxiliary combustor 40 to a level in a range of 1400° F. or higher as required to incinerate dried sludge. Such temperature is to be determined on the basis of the characteristics of the material to be safe conditioned. Volatile hazardous ingredients in the dry sludge collected in hopper 22 are so safe conditioned prior to discharge to the open environment.

The dried sludge product flowing to safe conditioner incinerator 28 from hopper 22 through conduit 14a, feeder 14b and conduit 43 is slightly above 212° F. The dried material flows in and around tubes 44 which are contained in an insulated metal shell and are anchored in tube sheets 45 and 46.

Hot gas from auxiliary combustor 40 passes through conduit 42 to incinerator 28 tube sheet head contained by incinerator 28 shell and tube sheet 46, upward through the inside of tubes 44 to the tube sheet head contained by incinerator 28 shell and tube sheet 45.

Conduit 43 extends through incinerator 28 shell and connects to tube sheet 45.

Outlet conduit 48 of solids incinerator 28 is constructed similarly. Conduit 48 connects to educator 49.

Item 50 is a spreader piece which causes the inflow of dry sludge feed stock to spread uniformly throughout the heat exchanger cross section and is constructed of appropriate high temperature material.

Fluidizing air through conduit 51 is jetted through educator 49 and provides the energy to transport incinerated sludge from heat exchanger 28 through conduits 48 and 53 to a protected storage and cooling area (not shown) where said incinerated sludge can cool prior to final disposal.

A considerable amount of heat remains in the hot dry incinerated sludge discharge from conduit 53. Recovery of residual heat in the incinerated sludge end product could be used effectively for water treating plant services or other municipal heating functions, especially during winter periods.

Table 1, which follows, is typical and representative of one sludge dryer processing plant capacity only.

TABLE 1

Gas Turbine Rated Performance Data

| | |
|---|---:|
| Gas Turbine Exhaust Gas Flow, Lb/Sec | 44.40 |
| Gas Turbine Exhaust Gas Flow, MLb/Hr. | 159.84 |
| Gas Turbine Exhaust Gas Temp, F. | 997.00 |
| Gas Turbine Fuel Rate, Btu/kwhr | 11,223.00 |
| Gas Turb Electric Power Output (ISO), kwhr | 5,025.00 |
| Gas Turbine Fuel Consumption, MMBtu/Hr | 56.40 |
| Sludge Dryer Parameters | |
| Pressed Sludge Feed stock Moisture Content, % | 76.60 |
| Feed stock Moisture Heat of Vap, Btu/lb | 970.30 |
| Sludge Dryer Heat Losses, % | 5.00 |
| Sludge Feed Temp to Dryer, F. | 60.00 |
| Dry Sludge Specific Heat, Btu/lb/° F. | 0.18 |
| Gas Exhaust Temp from Sludge Vapor Incin., F. | 250.00 |

TABLE 1-continued

| | |
|---|---:|
| Dryer Sludge Solids Exit Temp., F. | 212.00 |
| Dryer Outlet Vapor Exit Temp, F. | 250.00 |
| Dryer Sludge Moisture Removal Eff, % | 100.00 |
| Gas Exhaust Temp from Sludge Solids Incin., F. | 250.00 |
| Vap Incin Ht Losses Equiv to ΔT, ° F. | 20.00 |
| Gas Exhaust Temp from Sludge Vapor Incin, F. | 270.00 |
| Performance Per Mlb/Hr GT Exh Gas Flow to Dryer | |
| Gas Flo to Dryer, Mlb/Hr (Calculation Variable) | 118.95 |
| GT Gas Temp to Dryer Inlet, F. | 997.00 |
| Ht Avail in Dryer to Evap Sludge Moisture, MMBtu/Hr | 22.81 |
| Ht Req. to Raise Sludge H2O Temp in Dryer, Btu/lb | 152.00 |
| Input to Dryer to Raise H2O Temp to Sat, MMBtu/Hr. | 3.39 |
| Ht Req to Raise Sludge Solids Temp in Dryer, Btu/lb . | 27.36 |
| Input to Dryer to Raise Solids Temp to Sat, MMBtu/Hr. | 0.19 |
| Sludge Moisture Vaporized in Dryer, Mlbs/hr | 22.33 |
| Dewatered Sludge Production Capacity, Mlb/Hr | 6.82 |
| Tons of Raw Sludge Processed, Tons/Hr | 14.58 |
| Outlet Temp of Sludge Solids from Incinerator, F. | 1,400.00 |
| Inlet Hot Gas Temp to Sludge Solids Incinerator, F. | 1,440.00 |
| Heat Input to Sludge Solids Incin, Btu/lb of Solids Flow | 210.60 |
| Total Ht Input to Sludge Solids Incin, MMBtu/Hr | 1.44 |
| Aux Combstr Ht Supp to GT Flo to Solids Incin, MMBtu/hr | 0.53 |
| Heat in GT Fxhaust Flow to Solids Incin, MMBtu/Hr | 0.90 |
| GT Exhaust Flow to Solids Incinerator, Mlb/Hr | 1.15 |
| Outlet Vapor Temp from Vapor Incinerator, F. | 1,400.00 |
| Inlet Hot Gas Temp to Vapor Incinerator, F. | 1440.00 |
| Total Ht Exchanged in Vapor Incinerator, MMBtu/Hr | 55.10 |
| Recycled Heat in Vapor Incinerator, MMBtu/Hr | 46.29 |
| Makeup heat from GT Exhaust Flow, MMBtu/Hr | 8.82 |
| Heat Sourced from Gas Turbine Exhaust, % | 71.21 |
| Heat Sourced from Auxiliary Combustor, % | 28.79 |
| GT Exhaust Heat to Vapor Incin, MMBtu/Hr | 6.28 |
| Aux. Combstr Ht Supp to Vapor Incin, MMBtu/Hr | 2.54 |
| GT Exhaust Flow to Vapor Incinerator, Mlb/Hr | 39.74 |
| Total GT Exhaust Heat Direct to Incinerators, MMBtu/Hr | 7.18 |
| GT Fuel Consum Per MLbs Exhaust Flow, MMBtu/Hr | 0.35 |

DESCRIPTION OF PREFERRED EMBODIMENTS

Thus, it will be seen that I have created an efficient embodiment of my invention which overcomes past problems; namely, disposal of high moisture sewage organic sludge in land fills, without having been de-watered and incinerated (safe conditioned), is not only costly but also can be hazardous to the environment as well as objectionable to residents living adjacent to said landfills. In the case where a gas turbine, coupled to an organic sludge disposal system, powers an electric generator (or other power consumer), any higher cost associated with production of energy as a consequence of reduced energy producer unit size, can be offset by reduction of sludge disposal charges and benefits which result from weight and volumetric reductions of the waste material upon which disposal fees are based. Also, the sludge safe conditioning process increases the number of disposal locations where it would be permissible to dump said safe conditioned and dewatered sludge end product.

For the apparatus and systems described herein, a specific objective of this invention is to reduce composite cost of sludge disposal resulting from said integrated operations.

Further, said process eliminates objectionable features associated with existing methods for disposal of processed municipal sewage sludge such as:

a.) Dumping of concentrated sludge which has only received primary treatment into permitted contained landfills close to populated areas, b.) The Bio-Composting sludge processing method produces excessive amounts of finished product which either accumulates in storage or in distribution of such material over land designated for agricultural use and which can cause excessive bio-concentrations in local, state and national waterways to the detriment of marine life therein, c.) Control of the primary bio-composting sludge processing operations is hampered by lack of means for rapid correction of faulty primary treatment.

d), Existing primary treatment systems are overloaded to a point where expenditures to correct the same result in greatly reduced benefits per unit of expenditure. Existing facilities have run out of expansion capability. Also, an exacting control means is needed to produce a truly safe conditioned end product from a secondary treatment facility. Capability of waste water sludge treatment facilities to satisfy ever increasing demands for new service hookups requires a substantial reconstitution of existing practices.

While I have illustrated and described various embodiments of my invention, these are by way of illustration only and various changes and modifications may be made within the contemplation of my invention and within the scope of the following claims:

I claim:

1. An apparatus utilizing the firing and exhaust gas components of a gas turbine power driver supplemented by a stand alone higher temperature heat source to safe condition solids and vapor components of waste water organic sludge feedstock which comprises:

a gas turbine power driver with an exhaust gas port;

said gas turbine power driver comprising a serially connected air intake, air compressor, a first combustor receiving air from said air compressor and a regulated supply of gas fuel from an external source, a device for igniting a mixture of said gas fuel and said compressed air in said first combustor, said first combustor discharging to a gas turbine power producer with exhaust gas port and, a coupling whereby said gas turbine drives an energy consumer;

a dryer connected to said gas turbine exhaust port;

facilities for feeding said waste water organic sludge having high moisture content to said dryer, said dryer being configured to transfer heat directly from said hot expanded partially cooled exhaust gas to a waste water organic sludge safe conditioner, said dryer having capability to evaporate at least a major portion of said high moisture content of said organic sludge input and, further, to segregate said evaporated vapor portion from residual low moisture solids content portion of said sludge.

2. An apparatus as recited in claim 1 and wherein a conduit is provided with an induced draft fan, which conduit serially connects said gas turbine power driver exhaust gas port to said dryer.

3. An apparatus as recited in claim 1 and wherein said dryer includes a hopper bin for collection of said residual solid low moisture solids content portion, including facilities to empty said hopper bin to maintain it in a ready to receive new material state.

4. An apparatus as recited in claim 1 and including fuel firing and combustion means to supplement heat input from said exhaust gas from said gas turbine power driver for incineration of said sludge vapor and solids at temperatures above operating temperatures of said gas turbine power driver exhaust gas flow.

5. An apparatus as recited in claim 4, said fuel firing and combustion means including a stand-alone fuel/gas turbine exhaust gas second combustor connected for increasing heat input to a portion of said exhaust gas flow from said gas turbine power driver to raise temperature of said exhaust gas portion to a level sufficient to incinerate said solids and said evaporated moisture portions of said organic sludge input to said dryer.

6. An apparatus as recited in claim 5 and wherein said sludge vapor and solid incineration functions are performed independently from each other.

7. An apparatus as recited in claim 5 wherein said sludge vapor incineration apparatus comprises a tubular closed circuit heat exchanger receiving said evaporated vapor portion from said dryer which passes through the lower temperature circuit of said vapor incinerator tubular closed circuit heat exchanger apparatus; flow through the higher temperature circuit of said vapor incinerator tubular closed circuit heat exchanger apparatus comprising a portion of said gas discharge from said stand alone fuel/gas turbine exhaust gas combustor in combination with said reheated dryer vapor exiting from said lower temperature circuit of said vapor incinerator tubular closed circuit heat exchange apparatus, whereby said evaporated vapor portion from said dryer is first reheated to approach incineration temperature and enriched to incineration temperature by mixing and combination with a portion of said gas flow from said stand alone fuel/gas turbine gas combustor, the combined flow, after a retention period required for incineration of the through said higher temperature circuit of said vapor incinerator from whence the combined mixture is exhausted safely to atmosphere.

8. An apparatus for evaporating water in a mixture of water and solids derived from the output of an organic waste water treatment plant;

including sources of gaseous heat, as hot gas from the exhaust of a gas turbine [and/or other apparatus, such as] at an intermediate temperature level or alternatively, from a higher level source of gaseous heat, as hot gas output from a stand alone combustor firing a mixture of air and fuel;

said intermediate gaseous heat evaporating said water and preheating said solids;

said high level gaseous heat being utilized for incinerating waste hazardous materials;

said apparatus being configured to segregate preheated solids from evaporated water vapor;

first conduit means to convey said segregated preheated solids to an first circuit in a first closed circuit heat exchanger;

second conduit means to convey a portion of said high level gaseous heat to a second circuit in said first closed circuit heat exchanger and in counter flow to said segregated preheated solids flow, heat transfer from said second circuit to said first circuit of said first closed circuit heat exchanger raising temperature of said preheated solids to a level which permits said solids to be deposited in permitted areas;

third conduit means to convey a portion of said intermediate level source of gaseous heat, to be utilized for evaporating said water and preheating said solids after being combined with said evaporated water vapors, to a first circuit of a second closed circuit heat exchanger;

a plenum chamber connected to the outlet of said first circuit of said second closed circuit heat exchanger;

fourth conduit means to convey a remaining portion of said high temperature source of gaseous heat, at peak temperature, to said plenum chamber wherein said remaining portion of said source of gaseous heat mixes with said outlet gas and vapors from said first circuit of said second closed circuit heat exchanger, raising temperature of said outlet gas and vapors from said first circuit of said second closed circuit heat exchanger to incineration level;

fifth conduit means connected to an outlet from said plenum chamber to convey said mixture of gaseous heat and evaporated water vapors in said plenum chamber to a second circuit in said second closed circuit heat exchanger and in counter flow to said first circuit of said second closed circuit heat exchanger;

heat transfer from said second circuit of said second closed circuit heat exchanger to said first circuit of said second closed circuit heat exchanger raising temperature of said mixture of gaseous heat and evaporated water vapors in said first circuit of said second closed circuit heat exchanger, and lowering temperature of said mixture of gaseous heat and evaporated water vapors in said second circuit of said second closed circuit heat exchanger;

said mixture of gaseous heat and evaporated water vapors exiting from said second circuit being safely discharged to atmosphere.

\* \* \* \* \*

UNITED STATES PATENT AND TRADEMARK OFFICE
CERTIFICATE OF CORRECTION

PATENT NO. : 6,125,633

DATED : October 3, 2000

INVENTOR(S) : Charles Strohmeyer, Jr.

It is certified that error appears in the above-identified patent and that said Letters Patent is hereby corrected as shown below:

Column 6, line 28, after "the" insert ---- dryer exhaust vapor, then passes in counter flow ----.
Column 6, line 36 and 37, delete "[and/or other apparatus, such as]".

Signed and Sealed this

Twenty-ninth Day of May, 2001

Attest:

NICHOLAS P. GODICI

Attesting Officer     Acting Director of the United States Patent and Trademark Office